Figure 1:
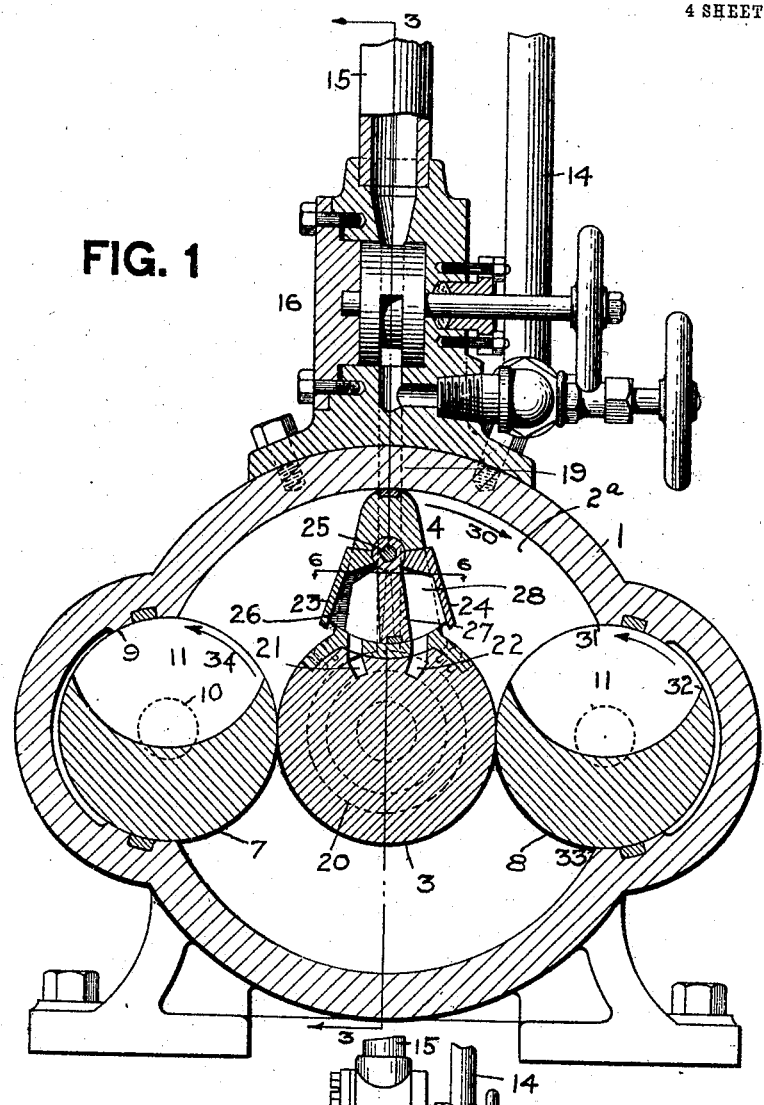

No. 806,399. PATENTED DEC. 5, 1905.
J. T. CUNNINGHAM.
ROTARY ENGINE.
APPLICATION FILED SEPT. 19, 1905.

4 SHEETS—SHEET 1.

WITNESSES.
J. R. Keller
J. F. Will

INVENTOR
John T. Cunningham
By Kay, Totten & Winter
his attys.

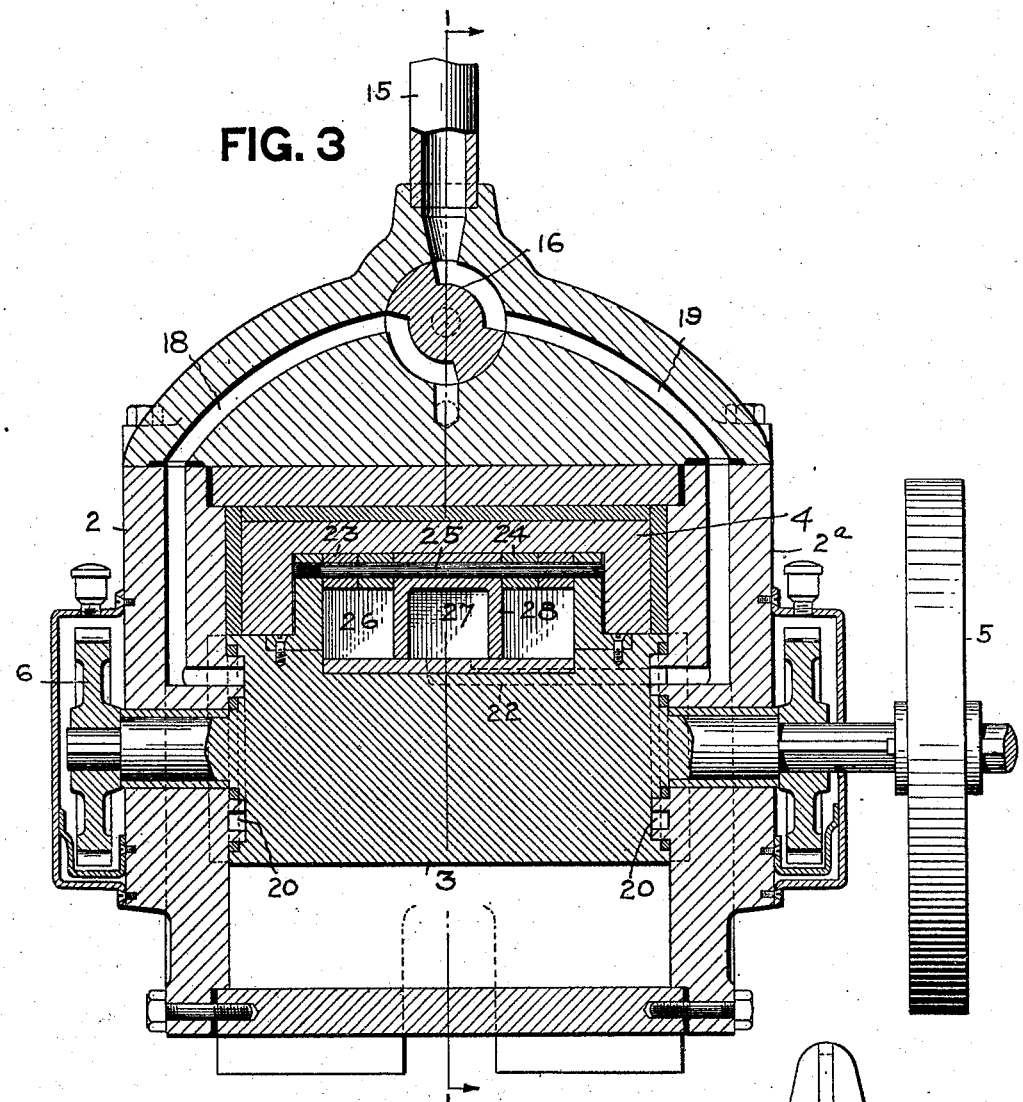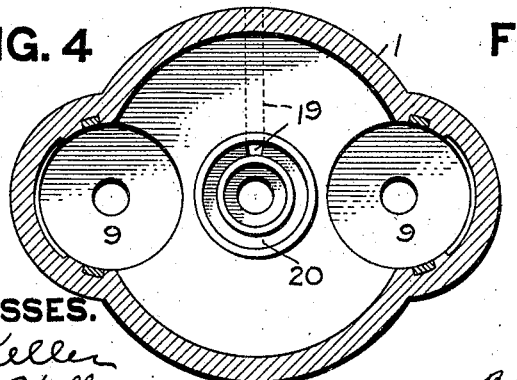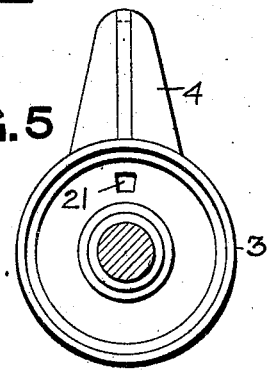

No. 806,399. PATENTED DEC. 5, 1905.
J. T. CUNNINGHAM.
ROTARY ENGINE.
APPLICATION FILED SEPT. 19, 1905.

4 SHEETS—SHEET 3.

WITNESSES.
J. R. Keller
J. F. Will

INVENTOR.
John T. Cunningham,
By Kay, Totten & Winter,
His Attys.

No. 806,399.   
J. T. CUNNINGHAM.  
ROTARY ENGINE.  
APPLICATION FILED SEPT. 19, 1905.

PATENTED DEC. 5, 1905.

4 SHEETS—SHEET 4.

WITNESSES.
J. R. Keller
J. F. Will

INVENTOR.
John T. Cunningham
By Kay, Totten & Winter,
His Attys

UNITED STATES PATENT OFFICE.

JOHN T. CUNNINGHAM, OF ALLEGHENY, PENNSYLVANIA.

ROTARY ENGINE.

No. 806,399. Specification of Letters Patent. Patented Dec. 5, 1905.

Application filed September 19, 1905. Serial No. 279,129.

*To all whom it may concern:*

Be it known that I, JOHN T. CUNNINGHAM, a resident of Allegheny, in the county of Allegheny and State of Pennsylvania, have invented a new and useful Improvement in Rotary Engines; and I do hereby declare the following to be a full, clear, and exact description thereof.

My invention relates to rotary engines; and the object is to provide an engine of this type which is readily reversible and which utilizes the motive fluid not only under pressure, but also under expansion, in practically the same manner as any ordinary reciprocating engine.

Various types of rotary engines have heretofore been designed, the ones most extensively in use being what are known as "turbines." These utilize the blowing action of the fluid medium being employed and depend for their efficiency upon the contour of the vanes. Other types have been devised in which the fluid medium acts directly against vanes, but in such manner that the efficiency depends upon the force of impact of the fluid medium. My engine is of the type in which the fluid medium acts directly against the vane, and the construction is such that the fluid medium will not only act by pressure, but also under expansion. The arrangement also is such that the fluid medium entering the cylinder will be automatically governed or regulated and will be cut off automatically when it reaches the desired pressure, thus maintaining a practically uniform pressure against the vane.

A further feature consists in such an arrangement of inlet and exhaust ports and valves that a constantly-regulated pressure will be maintained on one side of the vane and the pressure continuously and completely exhausted from the opposite side of the vane, thus utilizing the full efficiency of the pressure medium.

Another feature of the invention consists in so constructing the engine that it can be readily reversed and can be driven in either direction with equal facility and efficiency.

Other features of the invention will appear from the description and claims hereinafter made.

The engine is adapted to any motive fluid under pressure, such as steam, compressed air, gases, or the like.

Figure 2:
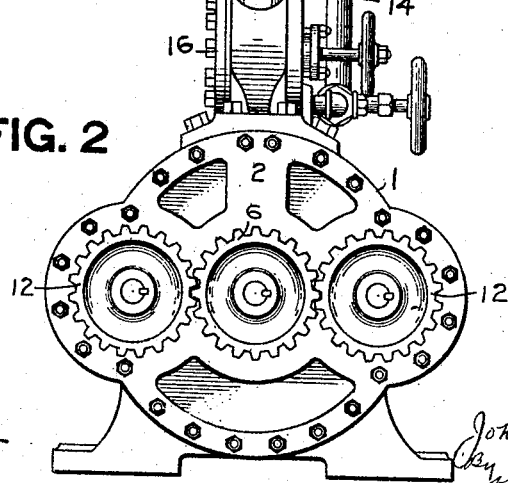
Figure 6:
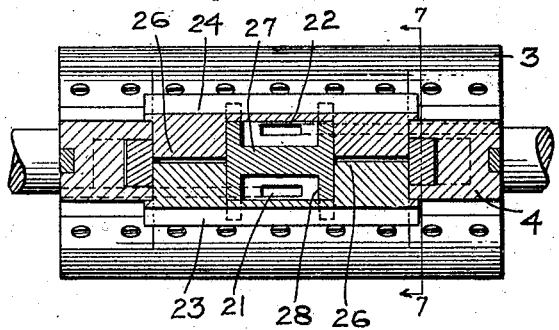
Figure 7:
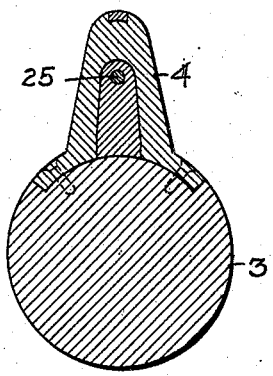
Figure 8:
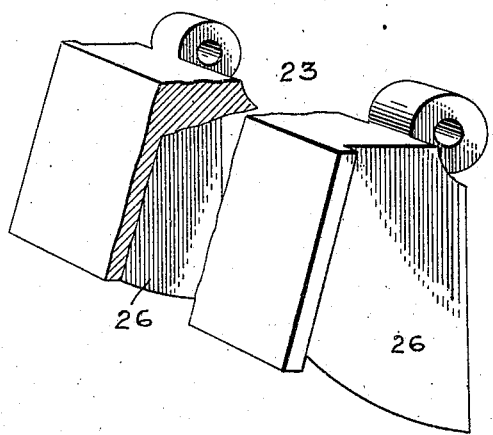
Figure 9:
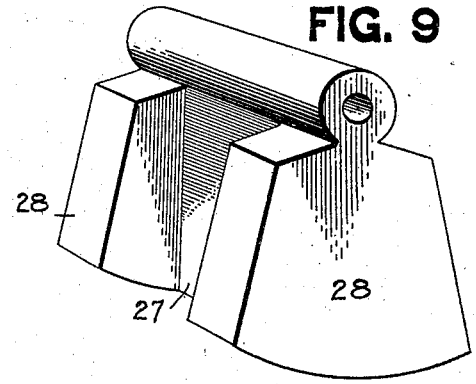
Figure 11:
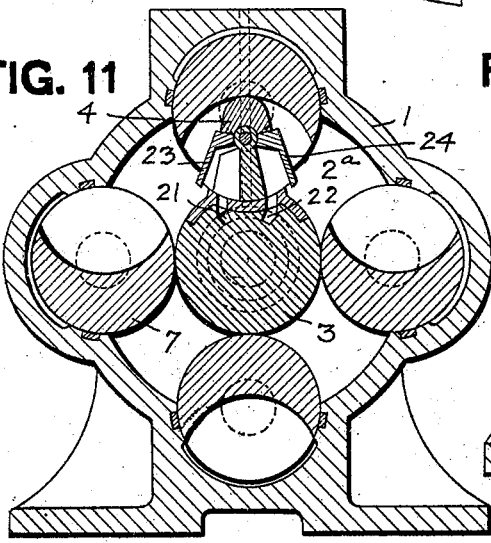
Figure 10:
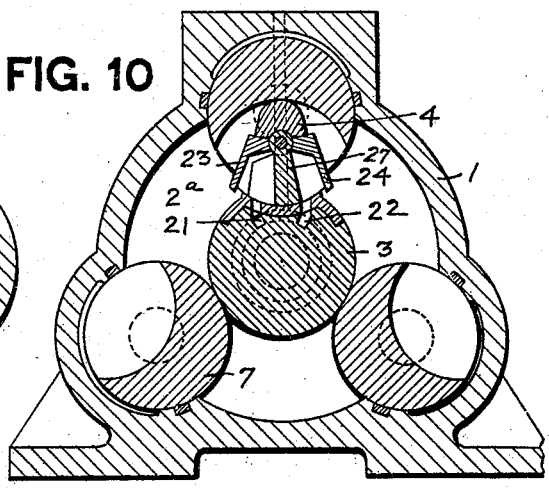
Figure 12:
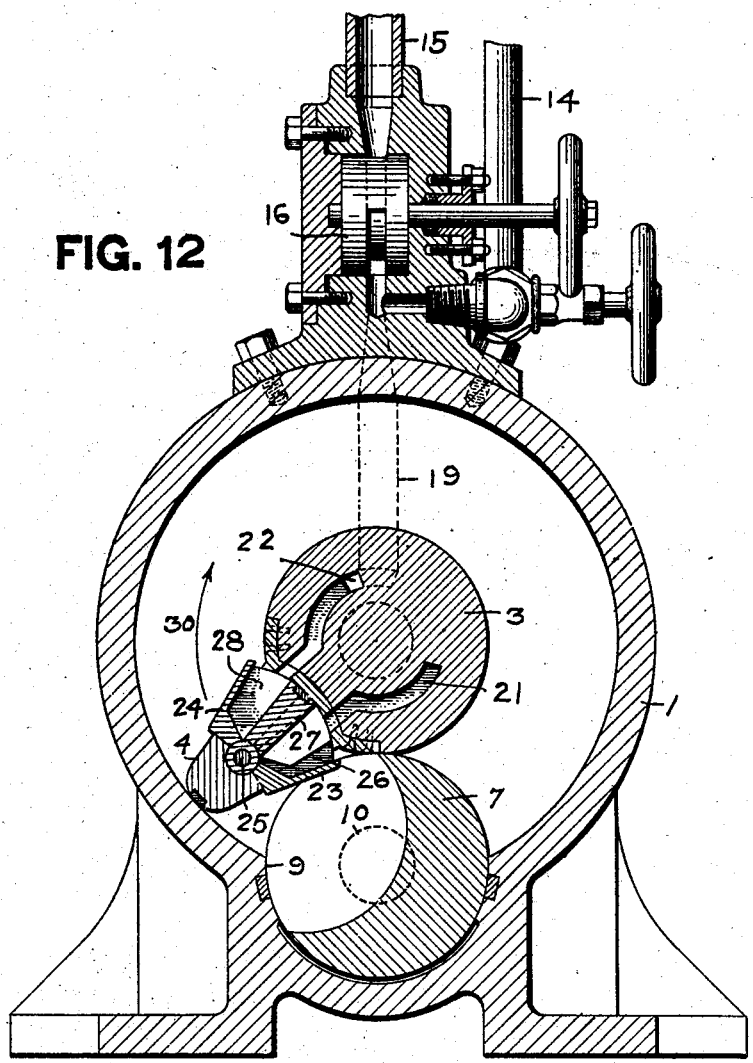
Figure 13:
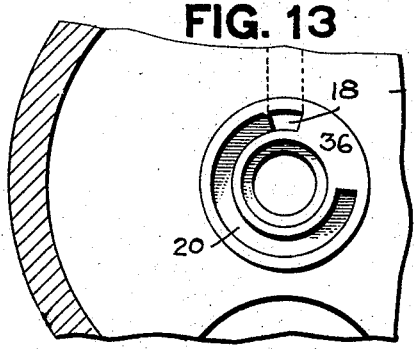
Figure 14:
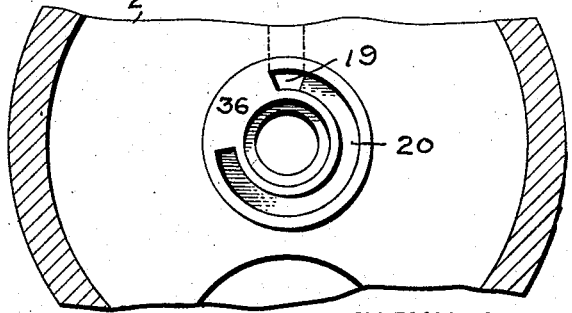

In the accompanying drawings, Figure 1 is a transverse vertical section through an engine constructed according to my invention, the section being taken on the line 1 1, Fig. 3. Fig. 2 is an end view of the same. Fig. 3 is a longitudinal vertical section taken on the line 3 3, Fig. 1. Fig. 4 is an inside view of one head of the cylinder. Fig. 5 is an end view of the main shaft and vane. Fig. 6 is a longitudinal section through the vane, taken on the line 6 6, Fig. 1. Fig. 7 is a transverse section through the vane and vane-hub, taken on the line 7 7, Fig. 6. Fig. 8 is a perspective view of a valve member, the same being broken to show its cross-section. Fig. 9 is a similar view of the valve-partition. Fig. 10 is a vertical section through a modification, showing three rotary abutments. Fig. 11 is a similar view showing four rotary abutments. Fig. 12 is a vertical transverse section showing a modification having one abutment. Fig. 13 is an inside view of one of the cylinder-heads of this modification, and Fig. 14 is a similar view of the opposite head.

My engine is provided with a suitable casing or cylinder 1, provided with end portions or heads 2 and 2ª. Mounted in this cylinder is the main shaft 3, which inside of the cylinder is enlarged or otherwise suitably provided with a hub. Mounted on or formed integral with this hub is the vane 4, against which the pressure medium acts in order to produce rotation of the shaft 3. The shaft 3 extends through the heads of the cylinders and on one end will be provided with a suitable fly-wheel 5 and will also be provided with suitable means whereby its power can be communicated to the machine or machines to be driven. The opposite end of the shaft outside of the cylinder-head is provided with a gear-wheel 6 for a purpose hereinafter to be described.

With all engines, whether of the rotating or reciprocating type, it is necessary that a stationary or substantially stationary abutment be provided, against which the pressure medium can back, and thus be enabled to drive or move the movable element or piston. In my engine the vane 4 takes the place of the usual piston of a reciprocating engine. One of the difficulties in constructing a proper rotary engine is to provide a suitable abutment or abutments located in opposition to the vane and against which the pressure medium will act, which abutment or abutments must be movable, so as to permit the vane to pass. I provide such abutment or abutments in the form of rolls or cylinders suitably journaled in the heads of the main cylinder and having a rolling or intermeshing contact with the main shaft or vane-hub and cut away, so as to permit the vane to pass. As shown in Fig. 1, the engine is provided with two such rotating abutments 7 and 8, which are identical in construction and mode of operation. Each of these has a practically steam-tight contact with the main shaft or vane-hub 3 and a similar fit in pockets or enlargements 9 in the cylinder-casing. They are provided with trunnions 10, which are suitably journaled in the heads of the main cylinder. These abutments are provided with cut-away portions 11 of the proper size and shape to permit the vane 4 to pass, but at the same time maintain a substantially steam-tight contact. These abutments obviously must rotate with the main shaft 3. They may be rotated for this purpose in any suitable way and by any suitable mechanism. I have shown for this purpose gears 12 on the ends of the trunnions of said abutments, which gears mesh with the gear 6 on the main shaft 3. Obviously various other mechanisms for this purpose may be used.

In order to maintain a constant pressure on one side of the vane 4 and a constant exhaust from its opposite side, it is essential that the inlets and exhausts be through the ends of the main shaft or vane-hub 3, and this is one of the important features of my engine. As shown in the drawings, the controlling-valve is located at the top of the cylinder; but this is a matter largely of choice. The induction-pipe is shown at 14 and the exhaust-pipe at 15. These pipes lead to a four-way valve 16, by means of which the pressure medium may be directed to either side of the vane 4 and the engine readily reversed. From the casing of the valve 16 ports 18 and 19 lead to the opposite heads of the cylinder. Each of these heads is provided on its inner face with an annular groove 20, which grooves communicate the one with the port 18 and the other with the port 19. The main shaft or vane-hub 3 is provided with two ports 21 and 22, one of which opens out through one end of said shaft, while the other opens out through the opposite end of said shaft, said ports being in constant communication with the annular grooves 20 in the heads of the cylinder, so that one of said ports is constantly open to the admission of pressure medium, while the other is constantly open to the atmosphere. One of these ports opens through the wall of the main shaft or vane-hub on one side of the vane 4, while the other port opens through the wall of said shaft or vane-hub on the opposite side of said vane.

The construction so far described will produce a rotary engine capable of efficient operation. I prefer, however, to provide automatically-arranged means for controlling the pressure acting against the vane 4. To this end the vane is cut out at its middle to provide space for regulating-valves. There are two valves 23 and 24, which are exactly similar and arranged to open on opposite faces of the vane. These valves are pivoted on a pintle 25 and are provided at their ends with inwardly-projecting wings 26, which are of considerable width, as shown in Fig. 6. Also hinged on the pintle 25 and lying between the valves 23 and 24 is the partition or diaphragm 27, which is provided at its ends with wings 28, which lie just inside the wings 26 on the valves. The meeting faces of the wings 26 and 28 have a ground fit, so that they work steam-tight on each other. The outer and lower faces of the wings 26 also have a steam-tight fit in the vane itself. As a consequence the area on the inner faces of the valves 23 and 24, which is subject to fluid-pressure, is between the wings 26, while the entire outer faces of said valves are subject to fluid-pressure. These valves are therefore differential, having a larger area exposed to fluid-pressure in the cylinder than to the fluid-pressure entering through the port 21 or 22.

The operation of the engine described is as follows: When the four-way valve 16 is in the position indicated in Fig. 3, the pressure medium will pass by the port 18 into the annular groove 20 in the left-hand head 2 of the main cylinder, whence it will flow through the port 21 into the chamber in the vane 4. This will cause the valve 23 on that side of the vane to open, permitting the pressure medium to pass into the main cylinder. It will fill the space between the vane and the movable abutment 7, thus forcing the vane in the direction of the arrow 30. As soon as the pressure in the cylinder has reached the desired degree the valve 23 will automatically close by reason of having an increased area exposed to cylinder-pressure, thus preventing further pressure medium from entering the cylinder. As soon, however, as the pressure falls materially by reason of expansion and exhaust and a balance is established the valve 23 will again automatically open and permit more live pressure medium to enter the cylinder. In this manner the pressure in the cylinder is automatically regulated and maintained at a substantially uniform pressure between certain extremes of high and low, as may have been previously determined upon and which is dependent on the relative areas of the valve exposed to cylinder and inlet pressure. In this position of the four-way valve 16 the valve 24 on the opposite side of the vane 4 will be open, due to the fact that the pressure behind the valve 23 will force the diaphragm 27 toward the valve 24, so that the wings 28 on said diaphragm will contact with the valve 24 and unseat the latter. Hence this side of the vane will be in constant open communication through the port 22, annular groove 20 in the right-hand head 2$^a$ of the main cylinder, and port 19 with the exhaust-pipe 15. As a consequence all the pressure on that side of the vane will be removed and the fullest efficiency of the fluid medium will be secured. As the vane moves in the direction of the arrow 30 it will turn the main shaft or vane-hub 3 in the same direction, and through the gearing described the abutments 7 and 8 will be rotated in unison therewith. The end of the vane will reach the point 31 at the casing practically at the same time that the edge 32 of the abutment 8 reaches the same point, and in the further rotation of the parts the vane will sweep through the cut-away portion 11 of the abutment, maintaining constantly a practically steam-tight joint. By the time the end of the vane has reached the point 33 the point 32 of the abutment is in full contact with the outer face of the main shaft or vane-hub, so that there will be no chance of the pressure medium escaping backwardly beyond the abutment 8. At the same time the abutment 7 has been rotating in the direction of the arrow 34; but at no time has it opened any communication between the two opposite sides of the vane. As a consequence these rotating elements act as abutments for the pressure medium in order to permit the latter to exert its pressure on the vane and at the same time act to prevent any of the live fluid escaping around to that side of the vane which is in communication with the exhaust. It will thus be seen that the arrangement provides a constant regulation of pressure on one side of the vane and a constant and complete exhaust from the opposite side of the vane and without any chance of permitting wastage of live pressure medium. To reverse the engine, the valve 16 will be given a quarter-turn, so as to direct the pressure medium through the port 19 into the annular groove 20 in the right-hand head 2ª of the cylinder and thence through the port 22 under the valve 24 in the vane and into the cylinder. On the opposite side of the vane the cylinder will be open through the valve 23, port 21, annular groove 20 in the head 2, and port 18 to the atmosphere. As a consequence the engine will be driven in the opposite direction. Since the valves 23 and 24 on the opposite sides of the vane are identical in construction and arrangement, the vane 4 can be driven in either direction with equal facility.

The number of rotating abutments may be varied to suit convenience or to meet special conditions. In Fig. 10 is shown a modification in which there are three rotating abutments; but these are constructed and operated in precisely the same manner as the two abutments shown in Fig. 1, and the engine is also the same in all other particulars. Fig. 11 shows precisely the same engine with four rotating abutments.

Figs. 12, 13, and 14 illustrate an engine in which there is only a single rotating abutment, and in this modification it is necessary to slightly change the admission and exhaust grooves 20 in the heads of the cylinder. These grooves instead of being full circles, as in the other modifications, are interrupted, as at 36, so that there is a slight period during the rotation of the main shaft in which the main cylinder is not in communication with the source of pressure medium. This is necessary because with the single rotating abutment shown the live fluid would be placed in communication with the exhaust side of the vane during a certain portion of the rotation of the abutment. This would result in waste of pressure medium, and in order to prevent this the grooves 20 are interrupted in the manner described, so as to shut off the inlet for a portion of the revolution of the main shaft. Both of the grooves are similarly interrupted, so that the engine can be driven in either direction without wasting pressure medium.

The engine described can be compounded to any desired degree. This can be done by connecting to the main shaft 3 other vanes working in cylinders of progressively-increasing size and conducting the pressure medium through these chambers in succession. When compounding with the form having only a single abutment, it will not be necessary to interrupt the grooves 20, as any pressure medium escaping in one cylinder will necessarily be utilized in the next cylinder.

What I claim is—

1. In a rotary engine, the combination of a chamber or casing, a rotating shaft or hub therein, a vane on said shaft, a rotating abutment having contact with the shaft and cut away to permit the vane to pass the same, an inlet through one head of the chamber, an outlet through the opposite head of the chamber, said inlet and outlet terminating in annular grooves on the inner faces of said head, and ports opening at the ends of the shaft and registering with said annular grooves, one of said ports opening on one side of the vane and the other opening on the opposite side of the vane.

2. In a rotary engine, the combination of a chamber or cylinder, a rotating shaft or hub therein, a vane on said shaft or hub, a rotating abutment having contact with the shaft and being cut away to permit the vane to pass the same, a constantly-open exhaust-port communicating with one side of the vane, a supply-port communicating with the opposite side of the vane, and a valve controlling the inlet, said valve being controlled automatically by the pressure in the cylinder and arranged to maintain such pressure substantially constant.

3. In a rotary engine, the combination of a chamber, a rotating shaft or hub therein, a vane on said shaft, a rotating abutment having contact with said shaft and cut away to permit the vane to pass the same, an inlet to one side of said vane, an exhaust from the opposite side of the vane, and a differential valve controlling the inlet-port.

4. In a rotary engine, the combination of a chamber or cylinder, a rotating shaft or hub therein, a vane on said shaft, a rotating abutment having contact with said shaft and cut away to permit the vane to pass the same, said shaft having ports opening on opposite sides of the vane and leading out through the ends of the shaft to fluid supply and exhaust connections, and differential valves controlling the openings on both sides of the vane and arranged to open outwardly.

5. In a rotary engine, the combination of a chamber, or casing, a rotating shaft or hub therein, a vane on said shaft, a rotating abutment having contact with the shaft and cut away to permit the vane to pass the same, said shaft having passages therethrough opening on opposite sides of the vane and having communication with fluid supply and exhaust connections, and differential valves controlling said openings on both sides of the vane and each comprising a valve opening outwardly and having a greater area exposed to the cylinder-pressure than to the inlet-pressure.

6. In a rotary engine, the combination of a chamber or casing, a rotating shaft or hub therein, a vane on said shaft, a rotating abutment having contact with the shaft and cut away to permit the vane to pass the same, said shaft having passages therethrough opening on opposite sides of the vane and having communication with fluid supply and exhaust connections, differential valves controlling said openings on both sides of the vane and each comprising a valve opening outwardly and having a greater area exposed to the cylinder-pressure than to the inlet-pressure, and a movable partition or diaphragm between said valves and having projections arranged to contact therewith.

7. In a rotary engine, the combination of a chamber or cylinder, a rotating shaft or hub therein, a vane on said shaft, a plurality of rotating abutments each having contact with the shaft and being cut away to permit the vane to pass the same, supply and exhaust ports communicating with annular grooves in the inner faces of the cylinder-heads, and ports in the main shaft opening at the ends thereof and communicating with said annular grooves and opening respectively on opposite sides of the vane.

In testimony whereof I, the said JOHN T. CUNNINGHAM, have hereunto set my hand.

JOHN T. CUNNINGHAM.

Witnesses:
MARGARET C. KEEBLE,
F. W. WINTER.